(12) United States Patent
Zhao et al.

(10) Patent No.: US 12,362,410 B2
(45) Date of Patent: Jul. 15, 2025

(54) BATTERY HEATING SYSTEM, BATTERY PACK, AND ELECTRICAL APPARATUS

(71) Applicant: CONTEMPORARY AMPEREX TECHNOLOGY CO., LIMITED, Ningde (CN)

(72) Inventors: Yuanmiao Zhao, Ningde (CN); Zhimin Dan, Ningde (CN); Zhanliang Li, Ningde (CN); Xiaojian Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/168,875

(22) PCT Filed: Jun. 14, 2022

(86) PCT No.: PCT/CN2022/098528
§ 371 (c)(1),
(2) Date: Feb. 14, 2023

(87) PCT Pub. No.: WO2023/092999
PCT Pub. Date: Jun. 1, 2023

(65) Prior Publication Data
US 2024/0429483 A1    Dec. 26, 2024

(30) Foreign Application Priority Data
Nov. 25, 2021  (CN) .......................... 202122926112.8

(51) Int. Cl.
*H01M 10/637* (2014.01)
*H01M 10/42* (2006.01)
(Continued)

(52) U.S. Cl.
CPC ....... *H01M 10/637* (2015.04); *H01M 10/425* (2013.01); *H01M 10/441* (2013.01);
(Continued)

(58) Field of Classification Search
CPC ............. H01M 10/637; H01M 10/615; H01M 10/425; H01M 10/441; H01M 10/48; H01M 2010/4271
See application file for complete search history.

(56) References Cited

U.S. PATENT DOCUMENTS 8,452,490 B2   5/2013   Lakirovich et al.
8,698,359 B2   4/2014   Ishishita et al.
(Continued)

FOREIGN PATENT DOCUMENTS

CN    103181053 A    6/2013
CN    105471001 A    4/2016
(Continued)

OTHER PUBLICATIONS

JP 2009142069 MT (Year: 2009).*
(Continued)

*Primary Examiner* — Alexander Usyatinsky
(74) *Attorney, Agent, or Firm* — Ladas & Parry LP (57) ABSTRACT

A battery heating system includes a switch assembly, and the switch assembly includes a first switch, a second switch, and a third switch. When the first switch is turned on and the second switch and the third switch are turned off, the first battery group and the second battery group are arranged in series connection and connected to a charging and discharging apparatus, for charging or discharging the first battery group and the second battery group after being connected in series. When the first switch is turned off and the second switch and the third switch are turned on, the first battery group and the second battery group are respectively con- (Continued)

nected to a battery heating apparatus to form a first loop and a second loop, and the first loop and the second loop are used for heating the first battery group and the second battery group.

13 Claims, 3 Drawing Sheets

(51) Int. Cl.
  *H01M 10/44* (2006.01)
  *H01M 10/48* (2006.01)
  *H01M 10/615* (2014.01)

(52) U.S. Cl.
  CPC ......... *H01M 10/48* (2013.01); *H01M 10/615* (2015.04); *H01M 2010/4271* (2013.01)

(56) References Cited

U.S. PATENT DOCUMENTS

| | | | |
|---|---|---|---|
| 10,957,950 | B1 | 3/2021 | Hou et al. |
| 2011/0144861 | A1 | 6/2011 | Lakirovich et al. |
| 2013/0320766 | A1 | 12/2013 | Ishishita et al. |
| 2019/0363550 | A1* | 11/2019 | Zuo ..................... H01M 10/425 |
| 2019/0363563 | A1* | 11/2019 | Zhang ..................... B60L 58/27 |
| 2021/0075073 | A1 | 3/2021 | Hou et al. |
| 2021/0245628 | A1* | 8/2021 | Zuo ......................... B60L 58/25 |
| 2022/0231537 | A1 | 7/2022 | Hirota et al. |

FOREIGN PATENT DOCUMENTS

| | | | |
|---|---|---|---|
| CN | 108736107 A | 11/2018 | |
| CN | 208774575 U | 4/2019 | |
| CN | 110116653 A | 8/2019 | |
| CN | 216389527 U | 4/2022 | |
| EP | 3573171 A1 | 11/2019 | |
| JP | 2004048913 A | 2/2004 | |
| JP | 2009142069 * | 6/2009 | |
| JP | 2009142069 A | 6/2009 | |
| JP | 2015159032 A | 9/2015 | |
| WO | WO-2020133615 A1 * | 7/2020 | ............ B60L 15/007 |
| WO | 2020230202 A1 | 11/2020 | |

OTHER PUBLICATIONS

The decision of JPO to grant a Patent for Application No. 2023-501524 (Year: 2024).*
Extended European Search Report for EP application No. 22798045.5, dated Nov. 29, 2023.
International Search Report for Application No. PCT/CN2022/098528, mailed Sep. 2, 2022.
Written Opinion for Application No. PCT/CN2022/098528, mailed Sep. 2, 2022.
Decision to Grant a Patent for JP application No. 2023-501524, dated Mar. 18, 2024.

* cited by examiner

BATTERY HEATING SYSTEM, BATTERY PACK, AND ELECTRICAL APPARATUS

CROSS REFERENCE TO RELATED APPLICATIONS

This application is a National Stage Entry of International Patent Application No. PCT/CN2022/098528, filed on Jun. 14, 2022, which claims priority to Chinese utility model application No. 202122926112.8 filed on Nov. 25, 2021. The aforementioned patent applications are incorporated herein by reference in their entirety.

TECHNICAL FIELD

The present application relates to the field of battery technologies, and more particularly to a battery heating system, a battery pack, and an electrical apparatus.

BACKGROUND

Due to the advantages of high energy density, recyclable charging, safety and environmental protection, power batteries are widely used in the fields of new energy vehicles, consumer electronics, energy storage systems and the like.

However, the use of power batteries in low temperature environments may be limited to a certain extent. Specifically, a discharge capacity of a power battery in a low temperature environment will seriously decline, and the power battery cannot be charged in the low temperature environment. Therefore, in order to enable the normal use of the power battery, it is necessary to heat the power battery in the low temperature environment.

At present, in order to heat the battery, a heating film is usually attached to a surface of a battery cell inside a battery, and heat generated by the heating film is transferred to the battery cell through contact with each other, thereby realizing the heating of the battery. However, this solution is essentially an external heating method, and there will be losses in the heat transfer process, resulting in a low heating efficiency and a large heating energy consumption.

SUMMARY

Examples of the present application provide a battery heating system, a battery pack, and an electrical apparatus, which can use a dual-branch battery heating solution to heat a battery without affecting an original output function of the battery, thereby improving the heating efficiency and reducing the heating energy consumption.

In a first aspect, a battery heating system is provided, including: a battery control apparatus; wherein the battery control apparatus includes a switch assembly, the switch assembly includes a first switch, a second switch, and a third switch, one end of the first switch is used for being connected to a negative electrode of a first battery group, the other end of the first switch is used for being connected to a positive electrode of a second battery group, one end of the second switch is used for being connected to the negative electrode of the first battery group, and one end of the third switch is used for being connected to the positive electrode of the second battery group; in a case that the first switch is turned on and the second switch and the third switch are turned off, the first battery group and the second battery group are arranged in series connection and connected to a charging and discharging apparatus, for charging or discharging the first battery group and the second battery group after being connected in series; in a case that the first switch is turned off and the second switch and the third switch are turned on, the first battery group and the second battery group are respectively connected to a battery heating apparatus to form a first loop and a second loop, and the first loop and the second loop are used for heating the first battery group and the second battery group.

By controlling the turning on and turning off of the first switch, switching between the series connection arrangement and an independent arrangement of the first battery group and the second battery group in a battery can be realized, and by controlling the turning on and turning off of the second switch and the third switch, the first battery group and the second battery group, when connected in series, can be connected to the charging and discharging apparatus, so as to realize the charging or discharging of the first battery group and the second battery group after being connected in series. When the first battery group and the second battery group are independently arranged, the first battery group and the second battery group can be respectively connected to the battery heating apparatus, so as to realize the heating of the first battery group and the second battery group. Therefore, the battery heating system in the example of the present application can use a dual-branch battery heating solution to heat a battery without affecting an original output function of the battery, thereby improving the heating efficiency and reducing the heating energy consumption.

In a possible implementation, the battery heating system further includes: the battery heating apparatus; wherein the battery heating apparatus includes a first bridge arm, a second bridge arm, and an energy storage element; in a case that the first switch is turned off and the second switch and the third switch are turned on, the first battery group and the second battery group are respectively connected to the battery heating apparatus, forming a first loop for the first battery group to discharge to the energy storage element and a second loop for the energy storage element and the first battery group to charge the second battery group, or forming a first loop for the second battery group to discharge to the energy storage element and a second loop for the second battery group and the energy storage element to charge the first battery group.

By heating the battery using the dual-branch battery heating solution, a temperature rise rate of low-temperature heating of the battery can be greatly improved, thereby improving the heating efficiency and reducing the heating energy consumption.

In a possible implementation, the battery control apparatus further includes an interface assembly, wherein the interface assembly includes a main positive interface, a main negative interface, a first heating positive interface, a first heating negative interface, a second heating positive interface, and a second heating negative interface, the main positive interface is used for being connected to the positive electrode of the first battery group, the main negative interface is used for being connected to the negative electrode of the second battery group, the other end of the second switch is connected to the first heating negative interface, and the other end of the third switch is connected to the second heating positive interface; in a case that the first switch is turned on and the second switch and the third switch are turned off, the first battery group and the second battery group are arranged in series connection and connected to the charging and discharging apparatus through the main positive interface and the main negative interface, for charging or discharging the first battery group and the second battery group after being connected in series; in a case that the first switch is turned off and the second switch and the third switch are turned on, the first battery group is connected to the battery heating apparatus through the first heating positive interface and the first heating negative interface, and the second battery group is connected to the battery beating apparatus through the second heating positive interface and the second beating negative interface, so as to form the first loop and the second loop.

By adding two pairs of heating interfaces in the original interface assembly, the first battery group and the second battery group are independently connected to the battery heating apparatus to form the first loop and the second loop for heating the battery, and the battery is connected to the charging and discharging apparatus through the original main positive interface and main negative interface, thereby realizing charging or discharging of the battery. That is, in the battery heating system of the example of the present application, by arranging an independent heating branch, the battery can be heated by using a dual-branch battery heating solution without affecting an original output function of the battery, thereby improving the heating efficiency and reducing the heating energy consumption.

In a possible implementation, the switch assembly further includes a fourth switch and a fifth switch, one end of the fourth switch is used for being connected to the positive electrode of the first battery group, the other end of the fourth switch is connected to the main positive interface, one end of the fifth switch is used for being connected to the negative electrode of the second battery group, and the other end of the fifth switch is connected to the main negative interface; in a case that the first switch, the fourth switch, and the fifth switch are turned on and the second switch and the third switch are turned off, the first battery group and the second battery group are arranged in series connection and connected to the charging and discharging apparatus through the main positive interface and the main negative interface, for charging or discharging the first battery group and the second battery group after being connected in series.

By arranged switches respectively between the positive electrode of the first battery group and the second battery group connected in series and the main positive interface and between the negative electrode and the main negative interface, when the battery does not need to be connected to the charging and discharging apparatus, the battery can be controlled in time to be disconnected from the charging and discharging apparatus.

In a possible implementation, the other end of the fourth switch is further connected to the first heating positive interface, and the other end of the fifth switch is further connected to the second heating negative interface; and in a case that the first switch is turned off and the second switch, the third switch, the fourth switch, and the fifth switch are turned on, the first battery group is connected to the battery heating apparatus through the first heating positive interface and the first heating negative interface, and the second battery group is connected to the battery heating apparatus through the second heating positive interface and the second heating negative interface.

The first heating positive interface shares the fourth switch with the main positive interface, and the second heating negative interface shares the fifth switch with the main negative interface; therefore, the modification of the battery heating system can be reduced, cost is reduced, and the control complexity of the battery heating system can be reduced.

In a possible implementation manner, the battery control apparatus further includes a current sensor, and the current sensor is used for detecting a current value in a loop formed during charging or discharging of the first battery group and the second battery group after being connected in series.

The current sensor measures the magnitude of a charging current or a discharging current of the first battery group and the second battery group after being connected in series, which can prevent the current from being too large and causing damage to the battery group. At the same time, the magnitude of the current measured by the current sensor may also be subject to an integral operation to obtain a quantity of charging charges or a quantity of discharging charges of the first battery group and the second battery group after being connected in series, so that a battery capacity state of the battery group may be determined, thereby prevent the occurrence of overcharge or over-discharge during use, and avoiding affecting the service life of the battery group.

In a possible implementation, one end of the current sensor is used for being connected to the positive electrode of the first battery group, and the other end of the current sensor is connected to the main positive interface.

The current sensor is arranged between the positive electrode of the first battery group and the main positive interface, so as to be convenient to measure the magnitude of the charging current or the discharging current of the first battery group and the second battery group after being connected in series, which can prevent the current from being too large and causing damage to the battery group.

In a possible implementation, the battery control apparatus further includes a pre-charging resistor, the switch assembly further includes a sixth switch, one end of the pre-charging resistor is connected to one end of the sixth switch, the other end of the pre-charging resistor is connected to one end of the fourth switch, the other end of the sixth switch is connected to the other end of the fourth switch, and the pre-charging resistor and the sixth switch are used for providing current-limiting for loads connected to the main positive interface and the main negative interface during charging or discharging of the first battery group and the second battery group after being connected in series.

The purpose of the pre-charging resistor and the sixth switch is providing the current-limiting to capacitive loads that may be connected to rear ends of the main positive interface and the main negative interface, so as to avoid an excessive instantaneous current from damaging a device in the high-voltage loop.

In a possible implementation, at least one switch in the switch assembly is a relay.

Compared with an ordinary switch, the relay is safer and easier to control.

In a second aspect, a battery pack is provided, including the above battery heating system in the first aspect and any possible implementation of the first aspect; a first battery group and a second battery group, wherein a negative electrode of the first battery group is connected to one end of the first switch and one end of the second switch, respectively, and a positive electrode of the second battery group is connected to the other end of the first switch and one end of the third switch, respectively.

By arranging the battery heating system according to the example of the present application in the battery, a dual-branch battery heating solution may be used to heat the battery without affecting an original output function of the battery, thereby improving the heating efficiency and reducing the heating energy consumption.

In a possible implementation manner, the battery pack further includes a first manual maintenance switch and a second manual maintenance switch, the first manual maintenance switch is connected to the first battery group in series, and the second manual maintenance switch is connected to the second battery group in series.

The purpose of the first manual maintenance switch and the second manual maintenance switch is providing protection for the first battery group and the second battery group when the first battery group and the second battery group work independently.

In a possible implementation manner, at least one battery group of the first battery group and the second battery group is formed by connecting a plurality of battery cells in series; and/or, at least one battery group of the first battery group and the second battery group is formed by connecting a plurality of battery cells in parallel and then in series.

In a third aspect, an electrical apparatus is provided, the electrical apparatus includes the battery pack in the second aspect or any possible implementation of the second aspect, and the battery pack is used for providing electric energy to the electrical apparatus.

DETAILED DESCRIPTION

Technical solutions of the present application will be described below with reference to the accompanying drawings.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are used for descriptive purposes only, and cannot be construed as indicating or implying relative importance. "Vertical" is not strictly vertical, but within the allowable range of errors. "Parallel" is not strictly parallel, but within the allowable range of errors.

Orientation words appearing in the following description are all directions shown in the drawings, and do not limit the specific structure of the present application. In the description of the present application, it should also be noted that, unless otherwise expressly specified and limited, the terms "mount," "connected," and "connecting" should be broadly understood, for example, they may be a fixed connection or a detachable connection or be an integrated connection; or may be a direct connection or an indirect connection through an intermediate medium. For those of ordinary skill in the art, the specific meanings of the above terms in the present application may be understood according to specific circumstances.

With the development of the times, new energy vehicles have huge market prospects and can effectively promote energy saving and emission reduction due to their advantages such as environmental protection, low voice, and low cost of use, which is conducive to social development and progress.

Due to electrochemical properties of a power battery, in a low temperature environment, charging and discharging capacities of the power battery are greatly limited, which seriously affects the experience of a customer in using a vehicle in winter. Therefore, in order to enable the normal use of the power battery, it is necessary to heat the power battery in the low temperature environment.

The power battery may be a lithium-ion battery, a lithium-metal battery, a lead-acid battery, a nickel-cadmium battery, a nickel-metal hydride battery, a lithium-sulfur battery, a lithium-air battery, a sodium-ion battery, or the like, which is not limited here. In terms of scale, the power battery in the example of the present application may be a battery cell/cell, or a battery module or a battery pack, which is not limited herein. In terms of an application scenario, the power battery may be applied in a power apparatus such as an automobile and a ship. For example, it may be applied to a power vehicle to supply power to a motor of the power vehicle as a power source for an electric vehicle. The power battery may also supply power to other electrical devices in the electric vehicle, such as an in-vehicle air conditioner and an in-vehicle player.

For case of description, the solution of the present application will be described below by taking the power battery applied to a new energy vehicle (that is, a power vehicle, or referred to as an electric vehicle) as an example.

At present, in order to heat the power battery (briefly referred to as "battery" below), a heating film is usually attached to a surface of a battery cell inside a battery, and heat generated by the heating film is transferred to the battery cell through contact with each other, thereby realizing the heating of the battery. This solution is essentially an external heating method, and there may be losses in the heat transfer process, resulting in major problems of a low heating efficiency and a large heating energy consumption. A large amount of battery power is consumed by the heating of the battery itself, resulting in a long charging time and a short range for an electric vehicle in winter.

For this reason, the example of the present application provides a solution for heating a battery, which can improve the heating efficiency and reduce the heating energy consumption.

Figure 1:
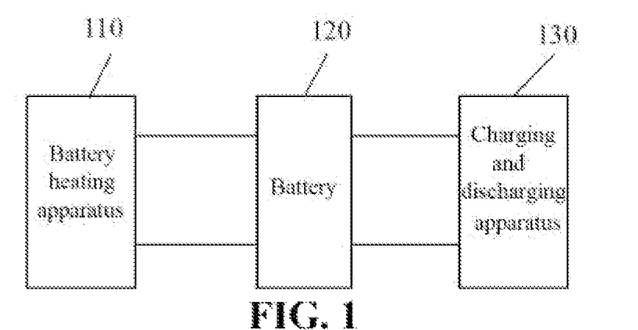
FIG. 1 is a schematic diagram of an application scenario of a battery heating apparatus according to an example of the present application.

FIG. 1 is a schematic diagram of an application scenario of a battery heating apparatus according to an example of the present application. As shown in FIG. 1, when battery 120 is connected to battery heating apparatus 110, battery heating apparatus 110 is used for heating battery 120. When battery 120 is connected to charging and discharging apparatus 130, charging and discharging apparatus 130 is used for charging or discharging battery 120. Charging and discharging apparatus 130 may include a charging apparatus or an electrical apparatus. The charging apparatus may be, for example, a charging pile used for charging battery 120. The electrical apparatus may be, for example, a motor, and battery 120 is connected to a drive circuit of the motor to provide a power source for the drive circuit, thereby ensuring normal traveling of the electric vehicle.

In an implementation manner, a battery management system (BMS) of battery 120 collects state information of battery 120, such as a battery temperature, a state of charge (SOC), a voltage signal, and a current signal, and determines, according to the state information, whether battery 120 needs to be heated. When it is determined that battery 120 needs to be heated, the BMS may send a heating request to a vehicle control unit (VCU). The VCU determines, according to the heating request sent by the BMS, whether to turn on battery heating apparatus 110 to heat battery 120.

For example, after receiving the heating request sent by the BMS, the VCU may determine whether to use battery heating apparatus 110 to heat battery 120 according to the SOC of battery 120. Battery 120 may be heated by battery heating apparatus 110 when battery 120 has sufficient power, that is, the SOC is high, such as higher than a threshold, and at this time, the normal driving of the power vehicle is not affected.

For another example, when the power of battery 120 is insufficient, that is, the SOC is low, such as lower than a threshold, battery beating apparatus 110 may not be used to heat the battery in order to reduce the battery heating loss. A motor controller, such as a microprogrammed control unit (MCU), may determine a motor state according to information such as a voltage and a current of the motor, and send the motor state to the VCU. Therefore, if the motor is in a normal working state at this time, battery 120 may be heated or kept warm by using the heat generated by the working loss of the motor. For example, a cooling liquid of battery 120 is heated by the heat generated by the working loss of the motor during driving, so that battery 120 is heated or kept warm by the cooling liquid.

Alternatively, when the SOC of battery 120 is low, battery heating apparatus 110 may also be started to heat battery 120, and the length of a heating cycle of battery heating apparatus 110 may be adjusted, or in other words, a heating frequency of battery heating apparatus 110 may be adjusted.

The present application does not limit a usage scenario of battery heating apparatus 110, and battery heating apparatus 110 of the example of the present application may be used for heating battery 120 in any required situation.

In a process of heating battery 120 by battery beating apparatus 110, the BMS of battery 120 may also monitor whether the temperature of battery 120 is abnormal. When the temperature of battery 120 is abnormal, for example, when a temperature difference between different battery cells in battery 120 is large, the BMS may send information indicating temperature abnormality to the VCU, and the VCU controls battery heating apparatus 110 to stop heating battery 120. At this time, battery 120 may be heated or kept warm by using the heat generated by the working loss of the motor. For example, a cooling liquid of battery 120 is heated by the heat generated by the working loss of the motor, so that battery 120 is heated or kept warm by the cooling liquid.

In the process of beating battery 120 by battery heating apparatus 110, if the temperature of battery 120 has met a requirement, the VCU may control battery heating apparatus 110 to stop heating battery 120. At this time, battery 120 may be kept warm by using the heat generated by the working loss of the motor. For example, the cooling liquid of battery 120 is heated by the heat generated by the working loss of the motor, so that battery 120 is kept warm by the cooling liquid.

When battery 120 includes a plurality of battery groups, in the prior art, each battery group is usually heated in sequence, or a plurality of battery groups are connected in parallel and then heated at the same time. However, the above first method prolongs the heating time, and the second method causes the current used for heating to be shunted, both of which lead to a low heating efficiency and affect user experience.

To this end, the present application provides a dual-branch battery heating solution. Through reasonable control, two battery groups can be heated at the same time. Since the current used for heating is not shunted, the temperature rise rate of low-temperature heating of the battery is greatly improved, and the heating efficiency is improved.

Figure 2:
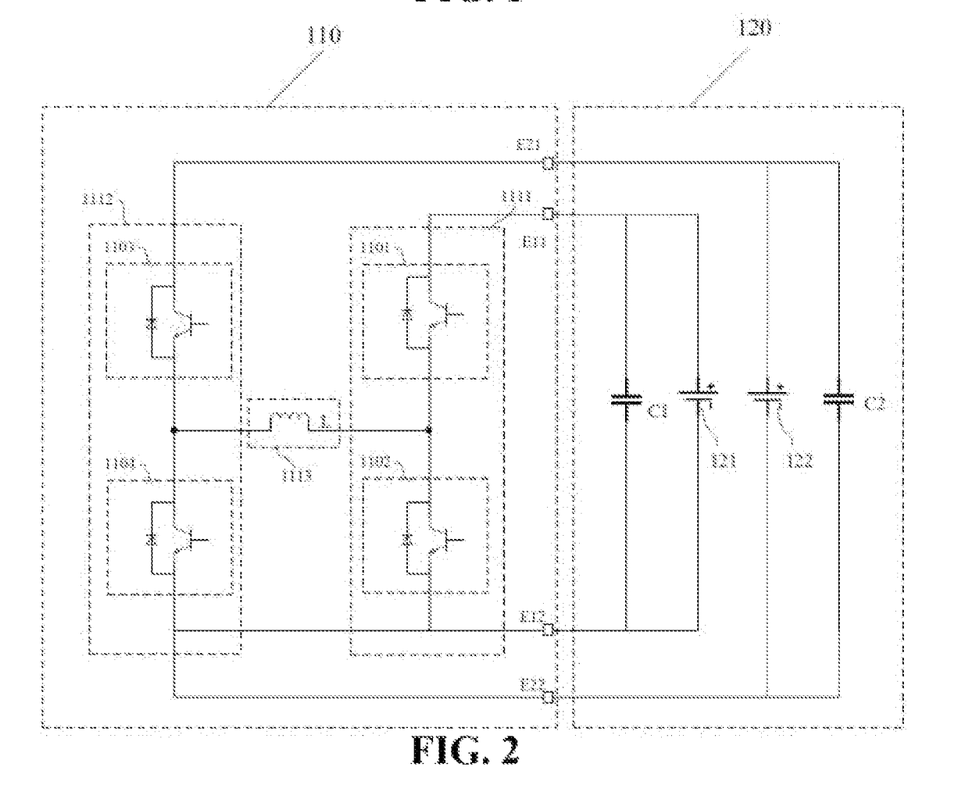
FIG. 2 is a schematic circuit diagram of a battery heating apparatus according to an example of the present application.

FIG. 2 is a schematic circuit diagram of battery heating apparatus 110 according to an example of the present application. As shown in FIG. 2, battery 120 includes first battery group 121 and second battery group 122, and battery heating apparatus 110 may heat first battery group 121 and second battery group 122 at the same time, battery heating apparatus 110 may include first bridge arm 1111, second bridge arm 1112, and energy storage element 1113. Energy storage element 1113 may be, for example, inductor L, or inductor L and a capacitor connected in series.

Two ends of first battery group 121 may further be connected in parallel to first capacitor C1, and two ends of second battery group 122 may further be connected in parallel to, for example, second capacitor C2. The first capacitor C1 and second capacitor C2 can realize functions such as absorbing a turn-off peak voltage of a corresponding bridge arm and battery voltage regulation. At the moment when battery heating apparatus 110 stops working, a bridge arm switch will be turned off correspondingly. A stray inductance and a current rate of change in the high-voltage loop will generate a huge peak voltage, which needs to be absorbed by first capacitor C1 and second capacitor C2; and voltage fluctuations of first battery group 121 and second battery group 122 need to be reduced, thereby improving the voltage stability of first battery group 121 and second battery group 122. In this way, the battery and high-voltage devices in the loop can be better protected from being damaged by voltage shocks.

First bridge arm 1111 and second bridge arm 1112 may be controlled by the VCU to form a loop for first battery group 121 to discharge to energy storage element 1113, and a loop for energy storage element 1113 and first battery group 121 to charge second battery group 122, so as to heat first battery group 121 and second battery group 122 during discharging and charging; and/or, first bridge arm 1111 and second bridge arm 1112 may be controlled by the VCU to form a loop for second battery group 122 to discharge to energy storage element 1113, and a loop for energy storage element 1113 and second battery group 122 to charge first battery group 121, so as to heat first battery group 121 and second battery group 122 during discharging and charging.

As can be seen, when battery heating apparatus 110 heats first battery group 121 and second battery group 122, by controlling turning on or off of first bridge arm 1111 and second bridge arm 1112, a loop for one battery in first battery group 121 and second battery group 122 to discharge to the energy storage element and a loop for the battery and the energy storage element to charge the other battery are formed. The discharging loop and the charging loop are switched back and forth. Due to the flow of current inside the two battery groups during the discharging and charging, the temperature of the batteries will rise, thereby realizing simultaneous beating of the two battery groups, and having a high beating efficiency.

As shown in FIG. 2, first end E11 of first bridge arm 1111 is connected to a first end of first battery group 121, and first end E21 of second bridge arm 1112 is connected to a first end of second battery group 122. Second end E12 of first bridge arm 1111 is connected to a second end of first battery group 121, and second end E22 of second bridge arm 1112 is connected to a second end of second battery group 122. First bridge arm 1111 includes first sub-bridge arm 1101 and second sub-bridge arm 1102, and second bridge arm 1112 includes third sub-bridge arm 1103 and fourth sub-bridge arm 1104.

The first end of first battery group 121 is a positive electrode of first battery group 121, and the second end of first battery group 121 is a negative electrode of first battery group 121. The first end of second battery group 122 is a positive electrode of second battery group 122, and the second end of second battery group 122 is a negative electrode of second battery group 122.

Energy storage element 1113 of the present application may be connected between first bridge arm 1111 and second bridge arm 1112. For example, as shown in FIG. 2, one end of energy storage element 1113 is connected between first sub-bridge arm 1101 and second sub-bridge arm 1102, and the other end of energy storage element 1113 is connected between third sub-bridge arm 1103 and fourth sub-bridge arm 1104.

The dual-branch battery heating solution provided by the example of the application needs to input two battery groups to battery heating apparatus 110, and therefore, the example of the application provides a battery heating system, which can use a dual-branch battery heating solution to heat a battery without affecting an original output function of the battery, thereby improving the heating efficiency and reducing the heating energy consumption.

Figure 3:
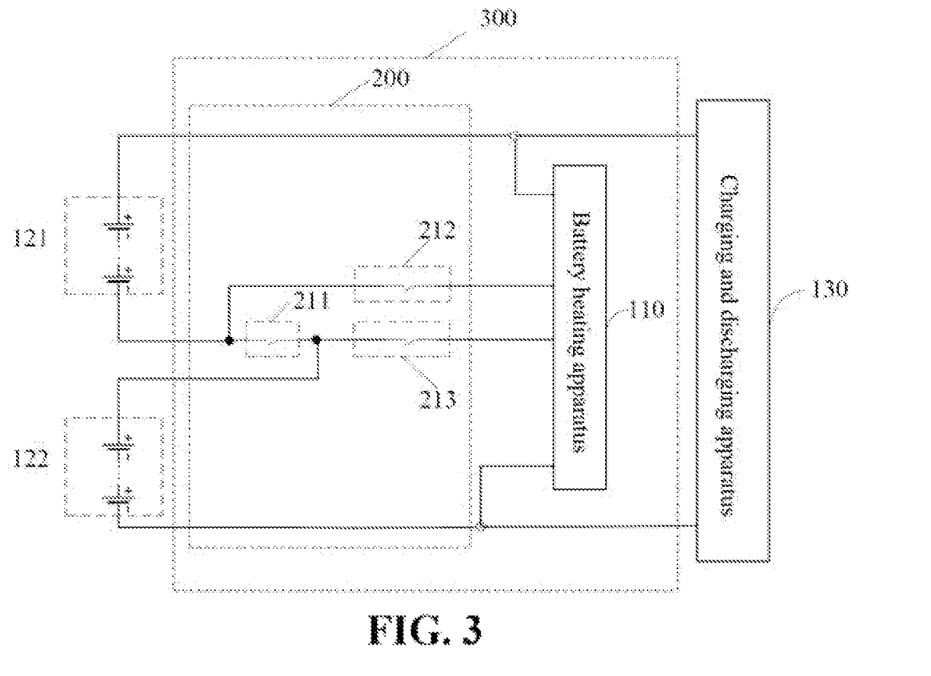
FIG. 3 is a schematic circuit diagram of a battery heating system according to an example of the present application.

FIG. 3 is a schematic block diagram of battery heating system 300 according to an example of the present application. As shown in FIG. 3, battery heating system 300 includes: battery control apparatus 200, battery control apparatus 200 includes a switch assembly, and the switch assembly includes first switch 211, second switch 212, and third switch 213. One end of first switch 211 is used for being connected to the negative electrode of first battery group 121, the other end of first switch 211 is used for being connected to the positive electrode of second battery group 122, one end of second switch 212 is used for being connected to the negative electrode of first battery group 121, and one end of third switch 213 is used for being connected to the positive electrode of second battery group 122.

In a case that first switch 211 is turned on and second switch 212 and third switch 213 are turned off, first battery group 121 and second battery group 122 are arranged in series connection and connected to charging and discharging apparatus 130, so as to charge or discharge first battery group 121 and second battery group 122 after being connected in series. Alternatively, in a case that first switch 211 is turned off and second switch 212 and third switch 213 are turned on, first battery group 121 and second battery group 122 are respectively connected to battery heating apparatus 110 to form a first loop and a second loop, and the first loop and the second loop are used for heating first battery group 121 and second battery group 122.

It should be noted that the battery group in the example of the present application mainly emphasizes the quantity of battery cells or the quantity of battery modules, rather than the structure of the battery group. In other words, the battery group includes at least one battery cell or at least one battery module, and whether the battery group further includes another structure is not limited in the example of the present application.

The series connection arrangement described here may refer to that the negative electrode of first battery group 121 is connected to the positive electrode of second battery group 122, and the positive electrode of first battery group 121 and the negative electrode of second battery group 122 are used as a positive electrode and a negative electrode of an entirety after first battery group 121 and second battery group 122 are connected in series. Alternatively, the negative electrode of second battery group 122 is connected to the positive electrode of first battery group 121, and the positive electrode of second battery group 122 and the negative electrode of first battery group 121 are used as a positive electrode and a negative electrode of an entirety after first battery group 121 and second battery group 122 are connected in series.

By controlling the turning on and turning off of first switch 211, switching between the series connection arrangement and an independent arrangement of first battery group 121 and second battery group 122 can be realized, and by controlling the turning on and turning off of second switch 212 and third switch 213, first battery group 121 and second battery group 122, when connected in series, can be connected to charging and discharging apparatus 130, so as to realize the charging and discharging of first battery group 121 and second battery group 122 after being connected in series. When first battery group 121 and second battery group 122 are independently arranged, first battery group 121 and second battery group 122 can be respectively connected to battery heating apparatus 110, so as to realize the charging and discharging of first battery group 121 and second battery group 122. Therefore, battery heating system 300 in the example of the present application can use a dual-branch battery heating solution to heat a battery without affecting an original output function of the battery, thereby improving the heating efficiency and reducing the heating energy consumption.

Optionally, as shown in FIG. 3, battery heating system 300 may further include battery heating apparatus 110, and a circuit structure of battery heating apparatus 110 may be as shown in FIG. 2. Specifically, the battery heating apparatus 110 may include first bridge arm 1111, second bridge arm 1112, and energy storage element 1113. In a case that first switch 211 is turned off and second switch 212 and third switch 213 are turned on, first battery group 121 and second battery group 122 are respectively connected to battery heating apparatus 110 to form a first loop for first battery group 121 to discharge to energy storage element 1113 and a second loop for energy storage element 1113 and first battery group 121 to charge second battery group 122, alternatively, form a first loop for second battery group 122 to discharge to energy storage element 1113 and a second loop for second battery group 122 and energy storage element 1113 to charge first battery group 121. The first loop and the second loop are used for heating first battery group 121 and second battery group 122.

The positive electrode of first battery group 121 is connected to first end E11 of first bridge arm 1111, the negative electrode of first battery group 121 is connected to second end E12 of first bridge arm 1111, the positive electrode of second battery group 122 is connected first end E21 of second bridge arm 1112, and the negative electrode of second battery group 122 is connected to second end E22 of second bridge arm 1112. Alternatively, the positive electrode of first battery group 121 is connected to first end E21 of second bridge arm 1112, the negative electrode of first battery group 121 is connected to second end E22 of second bridge arm 1112, the positive electrode of second battery group 122 is connected to first end E11 of first bridge arm 1111, and the negative electrode of second battery group 122 is connected to second end E12 of first bridge arm 1111.

By heating first battery group 121 and second battery group 122 using the dual-branch battery heating solution, a temperature rise rate of low-temperature heating of the battery can be greatly improved, thereby improving the heating efficiency and reducing the heating energy consumption.

Figure 4:
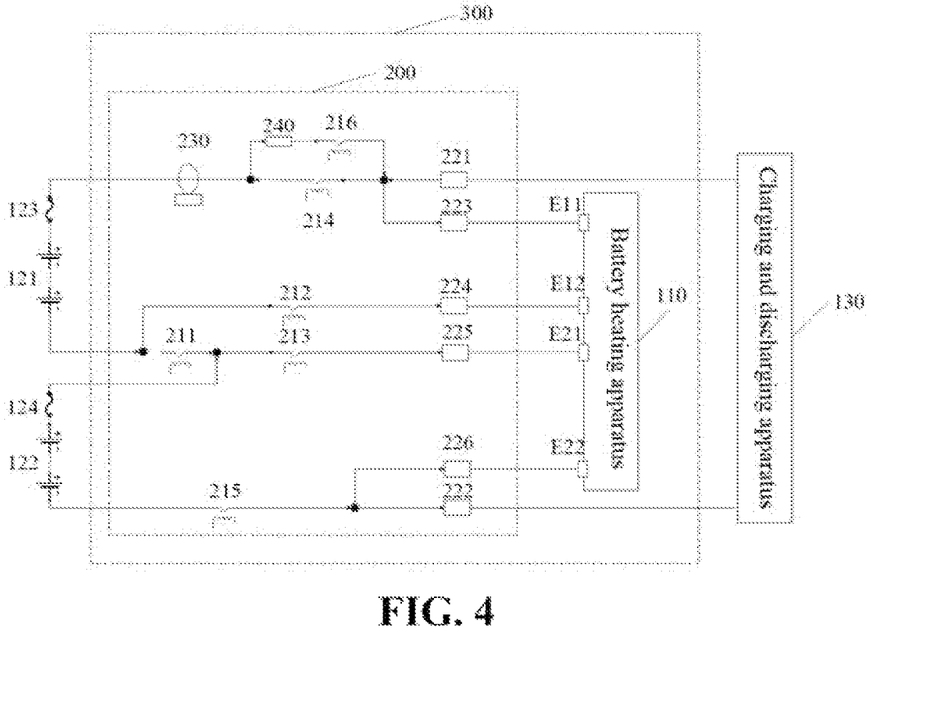
FIG. 4 is another schematic circuit diagram of a battery heating system according to an example of the present application.

Optionally, in the example of the present application, as shown in FIG. 4, battery control apparatus 200 further includes an interface assembly, and the interface assembly may include main positive interface 221, main negative interface 222, first heating positive interface 223, first heating negative interface 224, second heating positive interface 225, and second heating negative interface 226. Main positive interface 221 is used for being connected to the positive electrode of first battery group 121, main negative interface 222 is used for being connected to the negative electrode of second battery group 122, the other end of second switch 212 is connected to first heating negative interface 224, and the other end of third switch 213 is connected to second heating positive port 225. In a case that first switch 211 is turned on and second switch 212 and third switch 213 are turned off, first battery group 121 and second battery group 122 are arranged in series connection and connected to charging and discharging apparatus 130 through main positive interface 221 and main negative interface 222, for charging or discharging first battery group 121 and second battery group 122 after being connected in series. Alternatively, in a case that first switch 211 is turned off and second switch 212 and third switch 213 are turned on, first battery group 121 is connected to battery heating apparatus 110 through first heating positive interface 223 and first heating negative interface 224, and second battery group 122 is connected to battery heating apparatus 110 through second heating positive interface 225 and second heating negative interface 226 to form a first loop and a second loop.

Optionally, referring to FIG. 4, the first heating positive interface 223 is connected to first input end E11 of battery heating apparatus 110, the first heating negative interface 224 is connected to second input end E12 of battery heating apparatus 110, the second heating positive interface 225 is connected to third input end E21 of battery heating apparatus 110, and the second heating negative interface 226 is connected to fourth input end E22 of battery heating apparatus 110. The first input end E11 and second input end E12 correspond to first end E11 and second end E12 of first bridge arm 1111 in FIG. 2, respectively, and the third input end E21 and fourth input end E22 correspond to first end E21 and second end E22 of second bridge arm 1112 in FIG. 2, respectively.

By adding two pairs of heating interfaces to the original interface assembly, first battery group 121 and second battery group 122 are independently connected to battery heating apparatus 110 respectively to form the first loop and the second loop for heating first battery group 121 and second battery group 122. Moreover, first battery group 121 and second battery group 122 after being connected in series are connected to charging and discharging apparatus 130 through original main positive interface 221 and main negative interface 222, thereby realizing charging or discharging of first battery group 121 and second battery group 122 after being connected in series. That is, in battery heating system 300 of the example of the present application, by arranging an independent heating branch, the battery can be heated by using a dual-branch battery heating solution without affecting an original output function of the battery, thereby improving the heating efficiency and reducing the heating energy consumption.

Still referring to FIG. 4, the switch assembly of battery control apparatus 200 further includes fourth switch 214 and fifth switch 215, one end of fourth switch 214 is used for being connected to the positive electrode of first battery group 121, and the other end of fourth switch 214 is connected to main positive interface 221, one end of fifth switch 215 is connected to the negative electrode of second battery group 122, and the other end of fifth switch 215 is connected to main negative interface 222. In a case that first switch 211, fourth switch 214, and fifth switch 215 are turned on and second switch 212 and third switch 213 are turned off, first battery group 121 and second battery group 122 are arranged in series connection and connected to charging and discharging apparatus 130 through main positive interface 221 and main negative interface 222, for charging or discharging first battery group 121 and second battery group 122 after being connected in series.

By arranged switches respectively between the positive electrode of first battery group 121 and second battery group 122 connected in series and main positive interface 221 and between the negative electrode and main negative interface 222, when the battery does not need to be connected to the charging and discharging apparatus, the battery can be controlled to be disconnected from the charging and discharging apparatus.

Still referring to FIG. 4, the other end of fourth switch 214 is further connected to first heating positive interface 223, and the other end of fifth switch 215 is further connected to second heating negative interface 226. In a case that first switch 211 is turned off and second switch 212, third switch 213, fourth switch 214, and fifth switch 215 are turned on, first battery group 121 is connected to battery heating apparatus 110 through first heating positive interface 223 and first heating negative interface 224, and second battery group 122 is connected to battery heating apparatus 110 through second heating positive interface 225 and second heating negative interface 226.

First heating positive interface 223 shares fourth switch 214 with main positive interface 221, and second heating negative interface 226 shares fifth switch 215 with main negative interface 222; therefore, the modification of battery heating system 300 can be reduced, cost is reduced, and the control complexity of battery heating system 300 can be reduced.

In another example, the first heating positive interface 223 does not share fourth switch 214 with main positive interface 221, and the second heating negative interface 226 does not share fifth switch 215 with main negative interface 222. That is, battery control apparatus 200 further includes a seventh switch and an eighth switch, the seventh switch is connected between the positive electrode of first battery group 121 and first heating positive interface 223, and the eighth switch is connected between the negative electrode of second battery group 122 and second heating negative interface 226. In a case that first switch 211, fourth switch 214, and fifth switch 215 are turned on and second switch 212, third switch 213, the seventh switch, and the eighth switch are turned off, first battery group 121 and the second battery group 122 are arranged in series connection and connected to charging and discharging apparatus 130 through main positive interface 221 and main negative interface 222, for charging or discharging first battery group 121 and second battery group 122 after being connected in series. Alternatively, first switch 211, fourth switch 214, and fifth switch 215 are turned off and second switch 212, third switch 213, the seventh switch, and the eighth switch are turned on, first battery group 121 is connected to battery heating apparatus 110 through first heating positive interface 223 and first heating negative interface 224, and second battery group 122 is connected to battery heating apparatus 110 through second heating positive interface 225 and second heating negative interface 226, thereby realizing heating of battery 120.

Still referring to FIG. 4, battery control apparatus 200 further includes current sensor 230, and the current sensor 230 is used for detecting a current value of a loop formed during charging or discharging of first battery group 121 and second battery group 122 after being connected in series.

Current sensor 230 measures the magnitude of a charging current or a discharging current of first battery group 121 and second battery group 122 after being connected in series, which can prevent the current from being too large and causing damage to the battery group. At the same time, the magnitude of the current measured by current sensor 230 may also be subject to an integral operation to obtain a quantity of charging charges or a quantity of discharging charges of first battery group 121 and second battery group 122 after being connected in series, so that a battery capacity state of the battery may be determined, thereby prevent the occurrence of overcharge or over-discharge during use, and avoiding affecting the service life of the battery group.

In one example, as shown in FIG. 4, current sensor 230 is connected between the positive electrode of first battery group 121 and main positive interface 221. That is, one end of current sensor 230 is connected to the positive electrode of first battery group 121, and the other end of current sensor 230 is connected to main positive interface 221. Further, one end of current sensor 230 is connected to the positive electrode of first battery group 121, and the other end of current sensor 230 is connected to fourth switch 214.

Current sensor 230 is arranged between the positive electrode of first battery group 121 and main positive interface 221, so as to be convenient to measure the magnitude of the charging current or the discharging current of first battery group 121 and second battery group 122 after being connected in series, which can prevent the current from being too large and causing damage to the battery group.

It should be noted that, the arrangement position of current sensor 230 is not limited in the example of the present application. For example, current sensor 230 may further be arranged between second battery group 122 and fifth switch 215, as long as it is arranged in the loop formed during charging or discharging of first battery group 121 and second battery group 122 after being connected in series.

Still referring to FIG. 4, the switch assembly in battery control apparatus 200 further includes sixth switch 216, and battery control apparatus 200 farther includes pre-charging resistor 240. One end of pre-charging resistor 240 is connected to one end of sixth switch 216, the other end of pre-charging resistor 240 is connected to one end of fourth switch 214, and the other end of sixth switch 216 is connected to the other end of fourth switch 214. Pre-charging resistor 240 and sixth switch 216 are used for providing current-limiting for loads connected to main positive interface 221 and main negative interface 222 during charging or discharging of first battery group 121 and second battery group 122 after being connected in series.

Specifically, when charging and discharging apparatus 130 charges first battery group 121 and second battery group 122 after being connected in series, the charging process is divided into a pre-charging process and a fast charging process. The pre-charging process refers to controlling charging and discharging apparatus 130 to output a small current to charge first battery group 121 and second battery group 122 after being connected in series. The fast charging process refers to controlling charging and discharging apparatus 130 to output a large current to charge first battery group 121 and second battery group 122 after being connected in series. In a case that first switch 211, fourth switch 214, fifth switch 215, and sixth switch 216 are turned on and second switch 212 and third switch 213 are turned off, the pre-charging process is started. When first battery group 121 and second battery group 122 after being connected in series meet a certain charging condition, sixth switch 216 may be turned off, while the states of other switches are maintained, and the fast charging process is started at this time.

The purpose of pre-charging resistor 240 and sixth switch 216 is providing the current-limiting to capacitive loads that may be connected to rear ends of main positive interface 221 and main negative interface 222, so as to avoid an excessive instantaneous current from damaging a device in the high-voltage loop.

Optionally, in the example of the present application, at least one switch in the switch assembly is a relay.

Compared with an ordinary switch, the relay is safer and easier to control.

Still referring to FIG. 4, first manual maintenance switch 123 and second manual maintenance switch 124 may be arranged inside battery 120, wherein the first manual maintenance switch 123 is connected in series to first battery group 121, and the second manual maintenance switch 124 is connected in series to second battery group 122.

The purpose of first manual maintenance switch 123 and second manual maintenance switch 124 is providing protection for first battery group 121 and second battery group 122 when first battery group 121 and second battery group 122 work independently.

Figure 5:
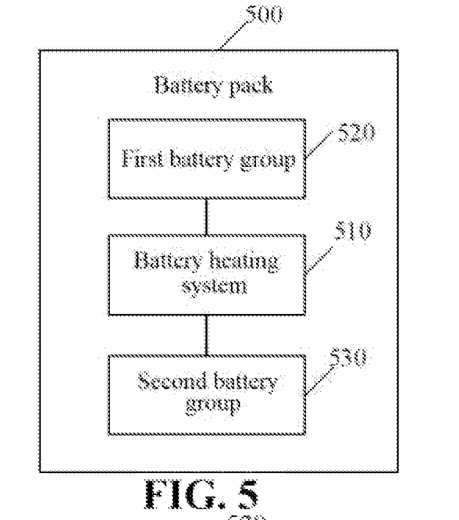
FIG. 5 is a schematic block diagram of a battery pack according to an example of the present application.

A schematic block diagram of a battery pack is further provided in the examples of the present application. As shown in FIG. 5, battery pack 500 includes battery heating system 510, first battery group 520, and second battery group 530. The battery heating system 510 is battery heating system 300 in the above various examples, the first battery group 520 corresponds to first battery group 121 in the above various examples, and the second battery group 530 corresponds to second battery group 122 in the above various examples. Specifically, a negative electrode of the first battery group 510 is connected to one end of first switch 211 and one end of second switch 212 respectively, and a positive electrode of second battery group 520 is connected to the other end of first switch 211 and one end of third switch 213 respectively.

By arranging the battery heating system according to the example of the present application in the battery, a dual-branch battery heating solution may be used to heat the battery without affecting an original output function of the battery, thereby improving the heating efficiency and reducing the heating energy consumption.

Optionally, in the example of the present application, the battery pack 500 further includes a first manual maintenance switch and a second manual maintenance switch, the first manual maintenance switch is connected to first battery group 520 in series, and the second manual maintenance switch is connected to second battery group 530 in series. The first manual maintenance switch corresponds to first manual maintenance switch 123 in the above various examples, and the second manual maintenance switch corresponds to second manual maintenance switch 124 in the above various examples.

Figure 6:
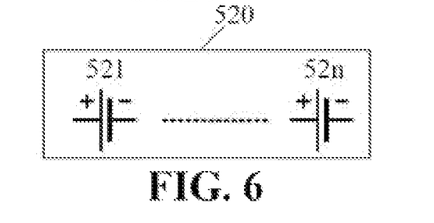
FIG. 6 is a schematic structural diagram of a battery group according to an example of the present application.
Figure 7:
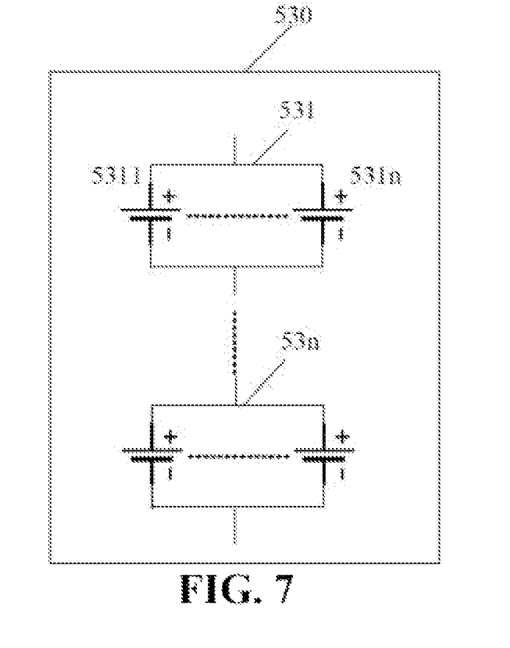
FIG. 7 is another schematic structural diagram of a battery group according to an example of the present application.

Optionally, in the example of the present application, at least one battery group of the first battery group 520 and second battery group 530 is formed by connecting a plurality of battery cells in series, and/or, at least one battery group of first battery group 520 and second battery group 530 is formed by connecting a plurality of cells in parallel and then in series. For example, first battery group 520 is formed by connecting a plurality of cells in series, and second battery group 530 is formed by connecting a plurality of battery cells in parallel and then in series. As shown in FIG. 6, first battery group 520 is formed by connecting battery cells 521 to 52n in series. As shown in FIG. 7, second battery group 530 is formed by connecting battery groups 531 to 53n in series, while battery group 531 is formed by connecting battery cells 5311 to 531n in parallel. The number of included battery cells in each battery group of the battery groups 531 to 53n may be the same or different, which is not limited in the example of the present application.

An electrical apparatus is provided in the examples of the present application, the electrical apparatus includes a battery pack, and the battery pack is used for providing electric energy to the electrical apparatus. The battery may include battery pack 500 in the above example.

Those of ordinary skill in the art may realize that units and algorithm steps of each example described with reference to the examples disclosed herein can be implemented in electronic hardware, or a combination of computer software and electronic hardware. Whether these functions are performed in hardware or software depends on a specific application and a design constraint condition of the technical solution. Those skilled in the art may implement the described functions using different methods for each particular application, but such implementations should not be considered beyond the scope of the present application.

In the several examples provided in the present application, it should be understood that the disclosed system, apparatus, and method may be implemented in other manners. For example, the apparatus example described above is only illustrative. For example, the division of the units is only a logical function division. In an actual implementation, there may be other division methods. For example, a plurality of units or components may be combined or may be integrated into another system, or some features may be ignored, or not implemented. On the other hand, the shown or discussed mutual coupling or direct coupling or communication connection may be indirect coupling or communication connection through some interfaces, apparatuses, or units, and may be in electrical, mechanical, or in other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in this example.

What is claimed is:

1. A battery heating system, comprising:
   a battery control apparatus; and
   a battery heating apparatus;
   wherein the battery control apparatus comprises a switch assembly, the switch assembly comprises a first switch, a second switch, and a third switch, one end of the first switch is connected to a negative electrode of a first battery group, the other end of the first switch is connected to a positive electrode of a second battery group, one end of the second switch is connected to a negative electrode of the first battery group, and one end of the third switch is connected to a positive electrode of the second battery group;
   when the first switch is turned on and the second switch and the third switch are turned off, the first battery group and the second battery group are arranged in series connection and connected to a charging and discharging apparatus, for charging or discharging the first battery group and the second battery group after being connected in series; and
   when the first switch is turned off and the second switch and the third switch are turned on, the first battery group and the second battery group are respectively connected to the battery heating apparatus to form a first loop and a second loop, and the first loop and the second loop are used for heating the first battery group and the second battery group after being connected in series,
   wherein the battery control apparatus further comprises an interface assembly, the interface assembly comprises a main positive interface, a main negative interface, a first heating positive interface, a first heating negative interface, a second heating positive interface, and a second heating negative interface;
   the main positive interface is connected to the positive electrode of the first battery group, the main negative interface is connected to the negative electrode of the second battery group, the other end of the second switch is connected to the first heating negative interface, and the other end of the third switch is connected to the second heating positive interface;
   when the first switch is turned on and the second switch and the third switch are turned off, the first battery group and the second battery group are arranged in series connection and connected to the charging and discharging apparatus through the main positive interface and the main negative interface, for charging and discharging the first battery group and the second battery group after being connected in series; and
   when the first switch is turned off and the second switch and the third switch are turned on, the first battery group is connected to the battery heating apparatus through the first heating positive interface and the first heating negative interface, and the second battery group is connected to the battery heating apparatus through the second heating positive interface and the second heating negative interface for forming the first loop and the second loop.

2. The battery heating system according to claim 1,
   wherein the battery heating apparatus comprises a first bridge arm, a second bridge arm, and an energy storage element;
   when the first switch is turned off and the second switch and the third switch are turned on, the first battery group and the second battery group are respectively connected to the battery heating apparatus to form a first loop for the first battery group to discharge to the energy storage element and a second loop for the energy storage element and the first battery group to charge the second battery group, or form a first loop for the second battery group to discharge to the energy storage element and a second loop for the second battery group and the energy storage element to discharge the first battery group.

3. The battery heating system according to claim 1, wherein the switch assembly further comprises a fourth switch and a fifth switch, one end of the fourth switch is connected to the positive electrode of the first battery group, the other end of the fourth switch is connected to the main positive interface, one end of the fifth switch is connected to the negative electrode of the second battery group, and the other end of the fifth switch is connected to the main negative interface;
- when the first switch, the fourth switch, and the fifth switch are turned on and the second switch and the third switch are turned off, the first battery group and the second battery group are arranged in series connection and connected to the charging and discharging apparatus through the main positive interface and the main negative interface, for charging or discharging the first battery group and the second battery group after being connected in series.

4. The battery heating system according to claim 3, wherein the other end of the fourth switch is further connected to the first heating positive interface, and the other end of the fifth switch is further connected to the second heating negative interface;
- when the first switch is turned off and the second switch, the third switch, the fourth switch, and the fifth switch are turned on, the first battery group is connected to the battery heating apparatus through the first heating positive interface and the first heating negative interface, and the second battery group is connected to the battery heating apparatus through the second heating positive interface and the second heating negative interface.

5. The battery heating system according to claim 1, wherein the battery control apparatus further comprises a current sensor, and the current sensor is used for detecting a current value in a loop formed during charging or discharging of the first battery group and the second battery group after being connected in series.

6. The battery heating system according to claim 5, wherein one end of the current sensor is connected to the positive electrode of the first battery group, and the other end of the current sensor is connected to the main positive interface.

7. The battery heating system according to claim 3, wherein the battery control apparatus further comprises a pre-charging resistor, the switch assembly further comprises a sixth switch, one end of the pre-charging resistor is connected to one end of the sixth switch, the other end of the pre-charging resistor is connected to one end of the fourth switch, the other end of the sixth switch is connected to the other end of the fourth switch, and the pre-charging resistor and the sixth switch are used for providing current-limiting for loads connected to the main positive interface and the main negative interface during charging or discharging of the first battery group and the second battery group after being connected in series.

8. The battery heating system according to claim 1, wherein at least one switch in the switch assembly is a relay.

9. A battery pack, comprising:
a battery heating system; and
a first battery group and a second battery group,
wherein the battery heating system comprises a battery control apparatus and a battery heating apparatus;
wherein the battery control apparatus comprises a switch assembly, the switch assembly comprises a first switch, a second switch, and a third switch, one end of the first switch is connected to a negative electrode of the first battery group, the other end of the first switch is connected to a positive electrode of the second battery group, one end of the second switch is connected to a negative electrode of the first battery group, and one end of the third switch is connected to a positive electrode of the second battery group;
when the first switch is turned on and the second switch and the third switch are turned off, the first battery group and the second battery group are arranged in series connection and connected to a charging and discharging apparatus, for charging or discharging the first battery group and the second battery group after being connected in series; and
when the first switch is turned off and the second switch and the third switch are turned on, the first battery group and the second battery group are respectively connected to the battery heating apparatus to form a first loop and a second loop, and the first loop and the second loop are used for heating the first battery group and the second battery group after being connected in series;
wherein the battery control apparatus further comprises an interface assembly, the interface assembly comprises a main positive interface, a main negative interface, a first heating positive interface, a first heating negative interface, a second heating positive interface, and a second heating negative interface;
the main positive interface is connected to the positive electrode of the first battery group, the main negative interface is connected to the negative electrode of the second battery group, the other end of the second switch is connected to the first heating negative interface, and the other end of the third switch is connected to the second heating positive interface;
when the first switch is turned on and the second switch and the third switch are turned off, the first battery group and the second battery group are arranged in series connection and connected to the charging and discharging apparatus through the main positive interface and the main negative interface, for charging and discharging the first battery group and the second battery group after being connected in series; and
when the first switch is turned off and the second switch and the third switch are turned on, the first battery group is connected to the battery heating apparatus through the first heating positive interface and the first heating negative interface, and the second battery group is connected to the battery heating apparatus through the second heating positive interface and the second heating negative interface, for forming the first loop and the second loop; and
wherein a negative electrode of the first battery group is connected to one end of the first switch and one end of the second switch respectively, and a positive electrode of the second battery group is connected to the other end of the first switch and one end of the third switch respectively.

10. The battery pack according to claim 9, wherein the battery pack further comprises a first manual maintenance switch and a second manual maintenance switch, the first manual maintenance switch is connected to the first battery group in series, and the second manual maintenance switch is connected to the second battery group in series.

11. The battery pack according to claim 9, wherein at least one battery group of the first battery group and the second battery group is formed by connecting a plurality of battery cells in series.

12. The battery pack according to claim 9, wherein at least one battery group of the first battery group and the second battery group is formed by connecting a plurality of battery cells in parallel and then in series.

13. An electrical apparatus, comprising a battery pack for providing electrical energy to the electrical apparatus, wherein the battery pack comprises:

a battery heating system; and a first battery group and a second battery group;

wherein the battery heating system comprises a battery control apparatus and a battery heating apparatus;

wherein the battery control apparatus comprises a switch assembly, the switch assembly comprises a first switch, a second switch, and a third switch, one end of the first switch is connected to a negative electrode of the first battery group, the other end of the first switch is connected to a positive electrode of the second battery group, one end of the second switch is connected to a negative electrode of the first battery group, and one end of the third switch is connected to a positive electrode of the second battery group;

when the first switch is turned on and the second switch and the third switch are turned off, the first battery group and the second battery group are arranged in series connection and connected to a charging and discharging apparatus, for charging or discharging the first battery group and the second battery group after being connected in series; and when the first switch is turned off and the second switch and the third switch are turned on, the first battery group and the second battery group are respectively connected to the battery heating apparatus to form a first loop and a second loop, and the first loop and the second loop are used for heating the first battery group and the second battery group after being connected in series;

wherein the battery control apparatus further comprises an interface assembly, the interface assembly comprises a main positive interface, a main negative interface a first heating positive interface, a first heating negative interface, a second heating positive interface, and a second heating negative interface;

the main positive interface is connected to the positive electrode of the first battery group, the main negative interface is connected to the negative electrode of the second battery group, the other end of the second switch is connected to the first heating negative interface, and the other end of the third switch is connected to the second heating positive interface;

when the first switch is turned on and the second switch and the third switch are turned off, the first battery group and the second battery group are arranged in series connection and connected to the charging and discharging apparatus through the main positive interface and the main negative interface, for charging and discharging the first battery group and the second battery group after being connected in series; and when the first switch is turned off and the second switch and the third switch are turned on, the first battery group is connected to the battery heating apparatus through the first heating positive interface and the first heating negative interface, and the second battery group is connected to the battery heating apparatus through the second heating positive interface and the second heating negative interface, for forming the first loop and the second loop; and wherein a negative electrode of the first battery group is connected to one end of the first switch and one end of the second switch respectively, and a positive electrode of the second battery group is connected to the other end of the first switch and one end of the third switch respectively.

\* \* \* \* \*